United States Patent
Borg et al.

(10) Patent No.: US 8,813,495 B2
(45) Date of Patent: Aug. 26, 2014

(54) TRIGGERED-TRAVEL JACK FOR A SAFETY SYSTEM

(75) Inventors: Evrard Borg, Pessac (FR); Eric Laspesa, Althen des Paluds (FR); Jean-Paul Nadeau, Saint Medard en Jalles (FR)

(73) Assignee: Herakles, Le Haillan (FR)

( * ) Notice: Subject to any disclaimer, the term of this patent is extended or adjusted under 35 U.S.C. 154(b) by 738 days.

(21) Appl. No.: 13/126,294

(22) PCT Filed: Oct. 21, 2009

(86) PCT No.: PCT/FR2009/052009
§ 371 (c)(1),
(2), (4) Date: Oct. 3, 2011

(87) PCT Pub. No.: WO2010/049625
PCT Pub. Date: May 6, 2010

(65) Prior Publication Data
US 2012/0011848 A1    Jan. 19, 2012

(30) Foreign Application Priority Data
Oct. 28, 2008  (FR) ...................................... 08 57317

(51) Int. Cl.
*F01B 29/08*    (2006.01)
*F02N 9/00*    (2006.01)
*B60K 28/10*    (2006.01)
*B60T 7/12*    (2006.01)
*F15B 15/19*    (2006.01)

(52) U.S. Cl.
CPC ..................................... *F15B 15/19* (2013.01)
USPC .................. 60/636; 60/632; 60/638; 180/274

(58) Field of Classification Search
CPC ...... F15B 15/19; F15B 15/02; F15B 15/1447; F15B 15/1476; F15B 15/204; F15B 15/22; F15B 15/261; F15B 15/262; B60R 21/38; B60R 21/2644; B60R 19/20; B60R 19/32; B60R 2021/01231; B60R 2021/26094; B60R 2021/2633; B60R 2021/2648; B60R 21/0134; B60R 21/0136; B60R 21/34; B60R 22/1954; B60R 22/1955
USPC ..................................... 60/632–638; 180/274
See application file for complete search history.

(56) References Cited

U.S. PATENT DOCUMENTS 3,186,163 A    6/1965  Dixon
4,860,698 A    8/1989  Patrichi et al.

FOREIGN PATENT DOCUMENTS

| FR | 2878212 | 5/2006 |
|---|---|---|
| GB | 707636 | 4/1954 |
| WO | WO 2005/085014 A1 | 9/2005 |

*Primary Examiner* — Christopher Jetton
(74) *Attorney, Agent, or Firm* — Hamre, Schumann, Mueller & Larson, P.C.

(57) ABSTRACT

A triggered-stroke actuator with its piston being held stationary in an initial position prior to triggering. The piston (13) is installed in the body (12) facing propulsion means (15) and a locking arrangement (19) that includes a latch (30) and at least one flexible tongue (23) attached to the periphery of the piston and having a hook (25) engaged with an internal abutment, the latch being moved at the beginning of triggering.

11 Claims, 2 Drawing Sheets

TRIGGERED-TRAVEL JACK FOR A SAFETY SYSTEM

The invention relates to a triggered-stroke actuator, in particular for incorporating in a motor vehicle safety system, more particularly a system enabling a pedestrian to be protected in the event of a front impact with the motor vehicle by causing its hood to be raised. The invention relates to an improvement to such an actuator, which improvement consists in locking the piston in its starting position so as to hold the mechanical parts connected to the rod of the actuator firmly in position, while nevertheless allowing the piston to be unlocked without requiring any additional order in the event of the actuator being triggered.

Numerous safety systems are known for protecting a pedestrian when struck by a motor vehicle. For example, document FR 2 878 212 describes a system comprising a mechanism enabling a motor vehicle hood to be raised rapidly during a collision. It often happens, in the event of a collision, that the pedestrian's head strikes the vehicle hood. That impact causes the hood to deform. Beyond a certain amount of deformation, the hood comes into contact with the engine and all of the rigid parts surrounding it. It is at that moment that the pedestrian's head is subjected to the greatest deceleration, which can give rise to severe consequences. That is why the system described in the above-mentioned document is designed to raise the hood suddenly through a certain height so as to avoid the pedestrian, and in particular the pedestrian's head, striking against the engine after deforming the hood. The hood is raised at its rear end, i.e. beside the windscreen, with the hood remaining fastened in hinged manner to the front of the motor vehicle.

Thus, such a safety device, providing it is actuated in time by suitable detector means, serve to raise the hood through at least 80 millimeters (mm) in a very short length of time of the order of 30 milliseconds (ms) after detecting an imminent impact.

Numerous improvements seeking to improve the behavior of that type of safety system and in particular the behavior of the actuator have been described. Mention may be made in particular of improvements seeking to cause the hood to return with damping in the event of an impact, the possibility of repositioning the hood after it has been triggered without there being a collision, and damping the movement of the piston at the end of the trigger stroke to avoid damaging the mechanism to which the actuator is connected.

Wherever possible, it is desirable to incorporate all of those improvements in the actuator itself.

On these lines, another concern of designers is to ensure that the piston of the actuator is properly locked (in its initial position, prior to triggering) and consequently to ensure proper locking of the piston rod that projects from the end of the actuator and that is connected to the hood-lifting mechanism, or to the hood itself if the connection is direct. Such locking serves to hold the mechanism, and thus the hood, firmly so long as the safety system is not triggered. Incorporating this locking function within the body of the actuator itself provides savings in terms of overall size and cost price.

For example, document WO 2005/085014 describes an actuator provided with a locking device constituted by balls arranged circumferentially in a groove formed in the wall of the actuator body. The balls are held radially by a central finger connected to the piston by a spring. The balls are secured to the piston of the actuator. In this position, the actuator is locked. To operate the actuator, a striker driven by an electromagnet pushes against the finger, which moves towards the piston, thereby releasing the balls from the circumferential groove and unlocking the piston. Thereafter, gas under pressure thrusts against the piston to deploy the actuator. It is possible to relock the actuator by applying a return action on the actuator rod. That device presents the drawback of requiring a special control member (electromagnet and striker) solely for the purpose of unlocking the actuator, thereby making it complex and expensive. Furthermore, the use of balls as locking means requires numerous machining points (in particular for their receptacles), thereby making the actuator complex to assemble and poorly compatible with robotic assembly lines.

The invention proposes another solution making it possible to avoid all of those drawbacks, i.e. an actuator having an internal locking device, which actuator is easy to assemble, inexpensive, unlockable to enable the actuator to operate without having recourse to a special control member, and optionally relockable by applying a return action to the actuator rod.

More precisely, the present invention provides a triggered-stroke actuator for a safety system, the actuator comprising a body, an actuating piston movable in the body, propulsion means for propelling said piston, and a locking arrangement for locking said piston, which arrangement co-operates with an internal abutment to hold said piston stationary in a predetermined position, the actuator being characterized in that said arrangement comprises a latch in the form of a cylindrical washer movable towards the piston by said propulsion means of said actuator in order to release said piston, and at least one flexible tongue attached to the periphery of the piston beside said propulsion means, and including a hook engaged with said internal abutment, and in that said latch is movable between a rear position where it backs onto said hook in engagement with said internal abutment, and a front position towards a transverse wall of the piston in which it is disengaged from said hook.

In an embodiment, said locking arrangement has at least two tongues disposed symmetrically about the travel axis of the piston and forming a guide for travel of the latch. For example, the tongues may have an inside surface in the form of a portion of a cylinder, and said latch in the form of a thick washer can slide between those two surfaces before the tongues retract towards the inside of the actuator body, during actuation movements.

In a preferred embodiment, the locking arrangement comprises four tongues, thereby limiting the flow section for gas around the periphery of the latch.

Preferably, said propulsion means are constituted by a pyrotechnic generator housed in the body.

When the generator is triggered, it initially causes the latch to move and consequently unlocks the piston, prior to causing the piston itself to move. It is thus extremely simple to initiate unlocking and no extra cost is involved.

In an embodiment, such a flexible tongue includes a thin zone.

The piston may include a skirt, e.g. a cylindrical skirt, from which the flexible tongue(s) constitutes one or more extensions. The end wall of the skirt thus constitutes an abutment against which the latch comes to bear at the end of the unlocking stroke.

If the abutment is frustoconical or similar in shape, then the latch remains blocked against the end of the skirt of the piston at the end of the unlocking stroke. Under such circumstances, the system is not reversible.

In contrast, in another possible embodiment, a spring is interposed between the latch and the piston to enable the piston to be relocked after it has been triggered.

The above-described arrangement is remarkable for its simplicity and its low cost price. During assembly of the parts constituting the actuator, it is possible to insert the piston including the tongue(s) directly in the body of the actuator until the hook(s) come into engagement with the internal abutment in the body of the actuator. This abutment may be constituted merely by an enlargement of the body of the actuator, thereby holding the piston in one travel direction, and by the end of the pyrotechnic actuator that holds the piston in the opposite travel direction.

The number of component elements is small compared with the prior art device.

The invention can be better understood and other advantages thereof appear better in the light of the following description of several embodiments of a triggered-stroke actuator in accordance with the principle of the invention, given purely by way of example and made with reference to the accompanying drawings, in which.

Figure 1:
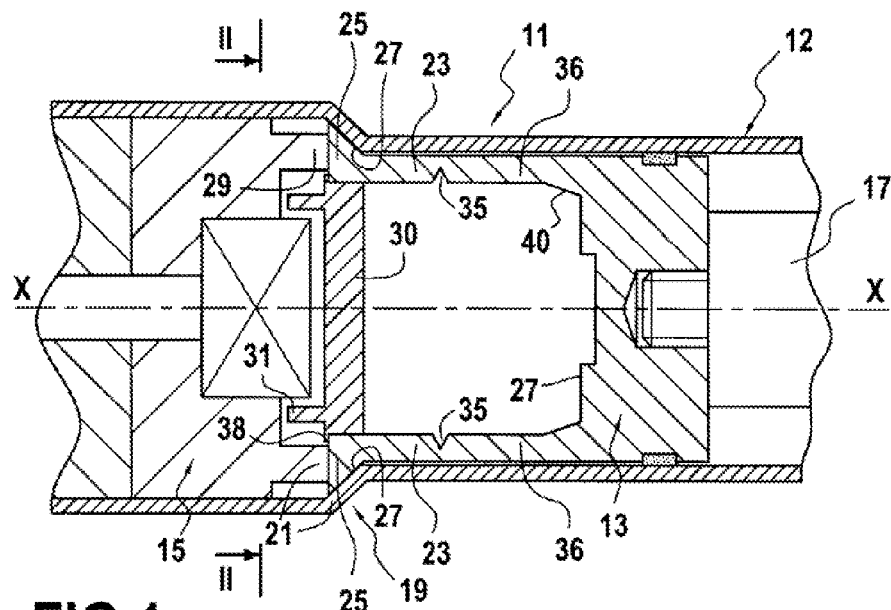
FIG. 1 is a fragmentary diagrammatic general view in longitudinal section of an actuator in accordance with the invention, prior to triggering.
Figure 2:
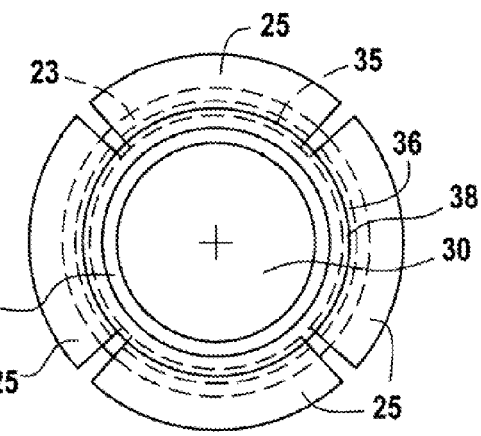
FIG. 2 is a section view on II-II of FIG. 1.
Figure 3:
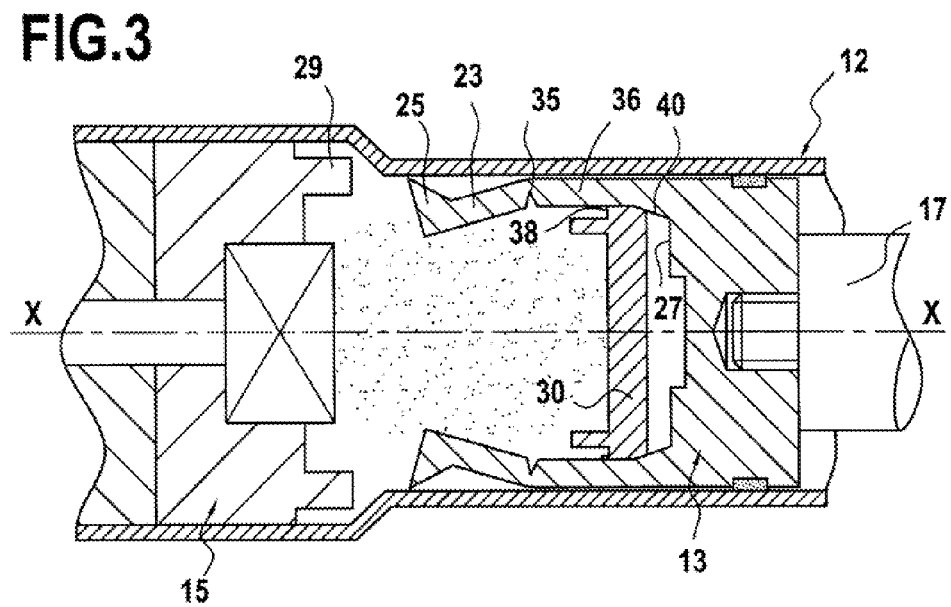
FIG. 3 is a view analogous to FIG. 1, after pyrotechnic triggering.

With reference to FIGS. 1 to 3 there can be seen an embodiment of a triggered-stroke actuator 11 in accordance with the invention that comprises a generally cylindrical body 12 having an actuator piston 13 movable in the body together with piston propulsion means constituted by a gas generator with pyrotechnic triggering, commonly referred to as a pyrotechnic generator 15.

The piston is extended by a rod 17 that projects axially from one end of the body. By way of example, this rod is connected to a mechanism for raising a motor vehicle hood.

According to an important characteristic, the actuator is fitted with a piston locking arrangement 19 that co-operates with an internal abutment 21 to hold the piston 13 stationary in a predetermined position. In this example, the locking arrangement comprises four flexible tongues 23 attached to the periphery of the piston beside the propulsion means. Each tongue 23 includes a hook 25 engaged with the internal abutment. In this example, the internal abutment is a double abutment and is constituted by a conical shoulder 27 of the wall of the body and by a front annular end 29 of the pyrotechnic generator 15. The hook of each flexible tongue is thus engaged, as shown, in an annular housing at the internal periphery of the body as defined by this double abutment 21. The structure of this locking arrangement makes assembly extremely simple since the piston may be inserted via the (larger diameter) rear end of the actuator body and held stationary therein by putting the pyrotechnic generator 15 into place.

The locking arrangement further comprises a latch 30 that is situated (prior to triggering) behind the tongue 23 in the vicinity of the two hooks 25. The latch 30 is in the shape of a simple cylindrical washer presenting a certain thickness and held between the two tongues. It is movable between a rear position (shown in FIG. 1) in which it is located against the backs of the hooks 25 in engagement with the annular internal abutment, and a front position (shown in FIG. 3) in which it is disengaged from the hooks and in abutment in the vicinity of the transverse wall 27 of the piston. The latch is moved towards this position specifically by the ignition of the pyrotechnic generator 15. In other words, the piston propulsion means also serve to move the latch for unlocking the piston so as to allow it to move.

In the example of FIGS. 1 to 3, the latch 30 has a rear skirt 31 that acts on triggering to channel the thrust of the gas towards the center of the latch.

As shown, the tongues 23 are arranged symmetrically in pairs about the travel axis XX of the piston and thus form a guide for moving the latch. The internal faces of the two tongues lie on a common cylindrical surface (FIG. 2) of diameter that corresponds to the diameter of the latch 30. It should be observed that on the pyrotechnic generator 15 being triggered, the latch is propelled forwards before the gas pressure has had time to reach equilibrium on both sides thereof.

If the locking arrangement has only two tongues, then they are likewise symmetrical about the axis XX. Under such circumstances, the shape of the latch may be modified so as to reduce the gas flow section at its periphery. For example, it may have two peripheral portions of greater diameter, corresponding to the diameter of the body.

As shown, each tongue 23 advantageously includes a thin zone 35 that facilitates bending of the tongue while the piston is moving along its stroke. In the example, the tongue may be connected to a cylindrical rear skirt 36 of the piston via said thin zone itself. In the example of FIG. 1, the latch includes a small rear rim 38 via which it comes into abutment against the end surfaces of the two hooks. This rim is destroyed on triggering.

Furthermore, facing the latch, the piston includes an abutment 40 against which the latch is pressed at the end of the unlocking stroke. In the example of FIGS. 1 to 3, the system is deliberately irreversible, i.e. there is no possibility of relocking the piston in its initial position after the pyrotechnic generator has been fired. That is why the abutment 40 is of frustoconical or similar shape in order to cause the latch to be retained at the end of the unlocking stroke.

Figure 4:
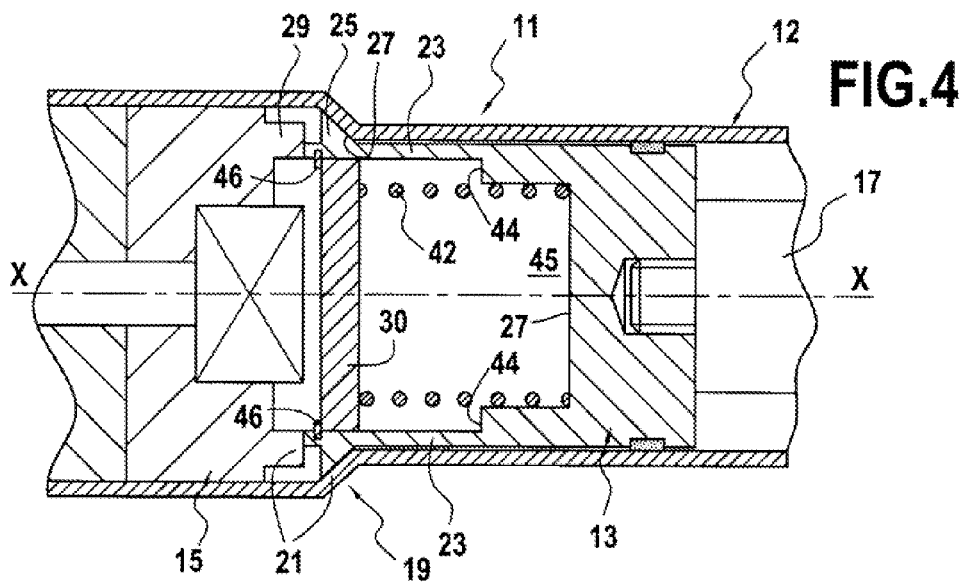
FIG. 4 is a view similar to FIG. 1 showing a variant.
Figure 5:
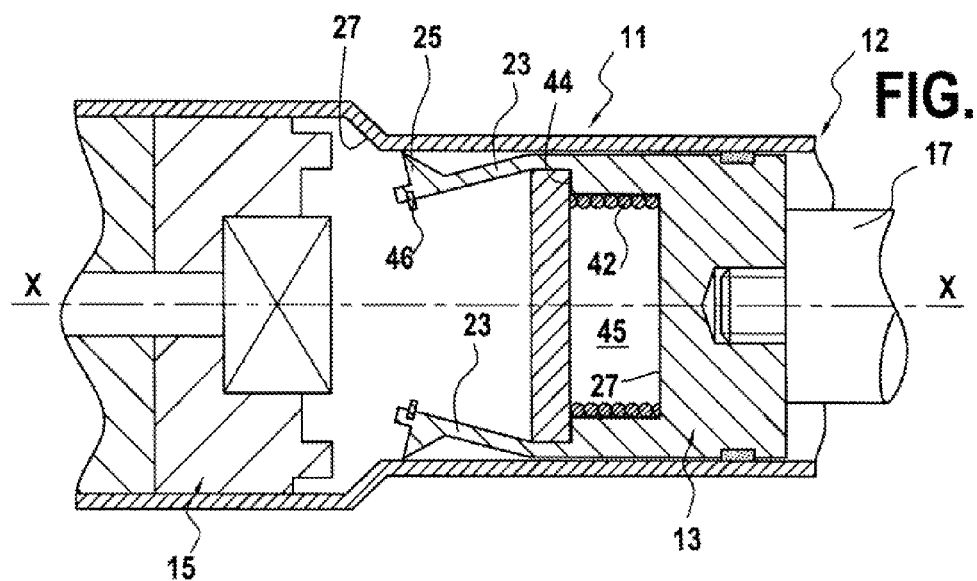
FIG. 5 is a view analogous to FIG. 4 after pyrotechnic triggering.

In the example of FIGS. 4 and 5, in which analogous elements are given the same numerical references, the system is relockable, in other words, after the pyrotechnic generator 15 has been fired, and consequently after the hood has been raised, it is possible to return the system into its initial position by relocking the piston 13. To do this, the latch 30 must be capable of returning automatically into its starting position, in register with the hooks 25. That is why a spring 42 is interposed between the latch and the piston.

In this embodiment, the flexibility of the tongues 23 is provided merely by the fact that they are of thickness that is smaller than the thickness of the skirt 36 of the piston to which they are connected. This thickness difference defines two shoulders 44 that constitute the end-of-stroke abutment for the latch 30. The spring 42 can thus compress (FIG. 5) in the cavity 45 that is situated between the shoulders 44 and the transverse wall 27 of the piston.

Furthermore, the flexible tongues 23 are provided with rear abutments 46 against which the latch presses under thrust from the spring 42. Before triggering, the position of the latch is thus determined by these rear abutments 46 and by the fact that the spring is pressing the latch against these abutments.

Figures 6, 7:
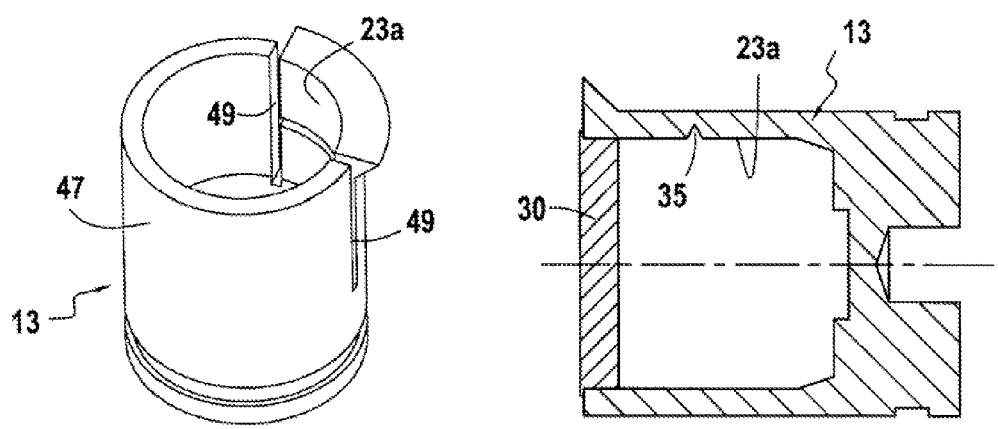
FIG. 6 is a perspective view of another embodiment of the piston, having only one tongue.
FIG. 7 is a section view of the FIG. 6 piston, with the latch.

FIGS. 6 and 7 show an embodiment in which a single flexible tongue 23a is cut out from the tubular skirt 47 of the piston 13 by two parallel longitudinal slots 49.

The invention claimed is:

1. A triggered-stroke actuator for a safety system, the actuator comprising a body, an actuating piston movable in the body, propulsion means for propelling said piston, and a locking arrangement for locking said piston, which arrangement co-operates with an internal abutment to hold said piston stationary in a predetermined position, wherein said arrangement comprises a latch in the form of a cylindrical washer movable towards the piston by said propulsion means of said actuator in order to release said piston, and at least one flexible tongue attached to the periphery of the piston beside said propulsion means, and including a hook engaged with said internal abutment, and wherein said latch is movable between a rear position where it backs onto said hook in engagement with said internal abutment, and a front position towards a transverse wall of the piston in which it is disengaged from said hook.

2. An actuator according to claim 1, wherein said locking arrangement includes at least two tongues disposed symmetrically about the travel axis of the piston and forming a guide for travel of said latch.

3. An actuator according to claim 2, wherein said locking arrangement has four tongues.

4. An actuator according to claim 1, wherein said propulsion means are constituted by a pyrotechnic generator housed in the body.

5. An actuator according to claim 1, wherein an abovementioned flexible tongue includes a thin zone facilitating bending thereof.

6. An actuator according to claim 5, wherein said tongue is connected to a rear skirt of said piston by said thin zone.

7. An actuator according to claim 1, wherein said piston includes, facing said latch, an abutment against which said latch comes to bear at the end of its unlocking stroke.

8. An actuator according to claim 7, wherein said abutment is of frustoconical or analogous shape in order to cause the latch to be retained at the end of the unlocking stroke.

9. An actuator according to claim 7, wherein a spring is interposed between the latch and the piston in order to enable it to be relocked after triggering.

10. An actuator according to claim 2 wherein a spring is interposed between the latch and the piston in order to enable it to be relocked after triggering and wherein said flexible tongues are provided with rear abutments against which said latch backs under thrust from said spring.

11. An actuator according to claim 1, wherein said latch includes a rear skirt.

* * * * *